United States Patent Office 3,322,496
Patented May 30, 1967

3,322,496
PROCESS FOR PRODUCING LEAD OXIDES
George J. Vahrenkamp, Stewart Manor, and Frederick M. Coppersmith, Queens Village, N.Y., assignors to National Lead Company, New York, N.Y., a corporation of New Jersey
Filed May 10, 1965, Ser. No. 454,370
5 Claims. (Cl. 23—146)

This application is a continuation-in-part of our co-pending application, Ser. No. 248,057, filed Dec. 28, 1962, now abandoned.

This invention relates to an improved process for producing finely divided lead oxide having varying amounts of metallic lead down to an extremely low content of metallic lead, and to an improved apparatus for carrying out the process.

Typical products representative but not restrictive of the process of the invention include chemical grade litharge having less than about 4% metallic lead associated therewith and battery oxides having higher amounts of metallic lead, as for example, 18 to 24% by weight of the product.

Litharge (PbO) of a low content of metallic lead (such as less than about 4%) is usually manufactured commercially from oxide products of lead having a larger content of metallic lead in mechanical furnaces, rotary kilns, drums, and the like. In these furnaces, kilns, etc., the metallic lead present is converted more fully to litharge, so that the content of free metallic lead is reduced to below about 4%. The production of litharge by such processes is unduly expensive and inefficient. Not only is it necessary to produce a preliminary oxidized lead product, but the oxidation treatment in the furnace, kiln, etc., is time consuming and expensive. Additionally, the litharge produced must be subjected to a subsequent milling or other grinding treatment to reduce the particle size of the litharge to make it useful as a pigment, etc. Thus a number of treatments and steps are required to produce a satisfactory commercial litharge.

Efforts have been bade in the past to use the Barton pot to produce litharge low in metallic lead. These efforts were unsuccessful, even when the process was conducted as a batch process, instead of in the customary continuous manner. The difficulty was that it was not found possible to produce consistently a litharge containing less than about 5% metallic lead. Such products, being high in metallic lead, are too unreactive to be suitable for chemical grade litharge where a relatively completely reactive litharge product is necessary. Chemical grade litharge is used to react with acids and other reagents to form salts and derivatives which are useful as pigments, stabilizers, driers, etc.

The failure of the previous efforts to use the Barton pot was very disappointing to manufacturers of litharge. The Barton pot process is a continuous one, in which molten lead is fed into a pot and vigorously agitated by a stirrer while a stream of air passes through the pot and carries off the oxide product through an uptake into a settling chamber. In previous efforts to use the Barton pot process to produce litharge of low metallic lead content, the pots were operated at temperatures in the order of 900° to 1000° F. Because of the failure of the Barton pot process to produce litharge low in metallic lead content, it has been necessary for the producer to employ mechanical furnaces, kilns and the like to produce a satisfactory product.

Likewise while the conventional prior art Barton pot process has been used to make lead oxides containing higher amounts of metallic lead, the products so produced did not possess the required hydrosetting properties when employed as battery oxides. This was so, even when the aforementioned products contained metallic lead inclusions in the range of 18 to 24%.

One object of this invention is to provide a new and improved process for producing lead oxides having desired contents of metallic lead more efficiently. Another object of this invention is to provide a novel process for producing litharge, low in metallic lead, using a Barton pot type of apparatus. An additional object of the invention is to provide a modified Barton pot process for producing a lead oxide product having amounts of metallic lead up to 18-24% by weight, including products having 18 to 24% metallic lead which are suitable for making lead storage battery plates. It is another object of the invention to provide a process for producing litharge, including litharge very low in metallic lead content which litharge does not require a separate or subsequent particle size reduction treatment.

A further object of this invention is the provision of improvements in the Barton oxide apparatus and process which make it possible to produce litharge economically.

As referred to herein, "low metallic" lead content is intended to refer the litharge containing less than about 4% metallic lead and preferably less than about 2% metallic lead.

Certain more or less empirical tests have been employed for judging the quality of a lead oxide product. Two of the most frequently used tests for this purpose are the apparent density test and the acid absorption test. The apparent density is determined by filling a one-inch cubical measuring cup with the product under a specified procedure and weighing the contents. Apparent densities of about 18 to 25 grams per cubic inch are readily obtained in the lead oxides prepared according to this invention.

The acid absorption of the material is determined by a standard but empirical procedure in which a weighed amount of the product is treated with sulphuric acid, and the amount of the acid absorbed in a certain time is determined. Acid absorptions of 160 to 180 (in terms of milligrams of $H_2SO_4$ absorbed by one gram of oxide product) in the case of low metallic lead products have been readily obtained by the process of the invention. In the case of products containing up to 18 to 23% metallic lead, acid absorption values of over 180 are obtained.

The process and apparatus of the invention will be better understood by referring to one suitable form of apparatus shown in the accompanying drawings in which FIG. 1 is a side elevational view partly in section of a modified Barton pot, uptake, cycline collector, settling chamber, return feeders, and associated parts modified so as to be suitable for use in conducting the process of this invention.

Figure 1:
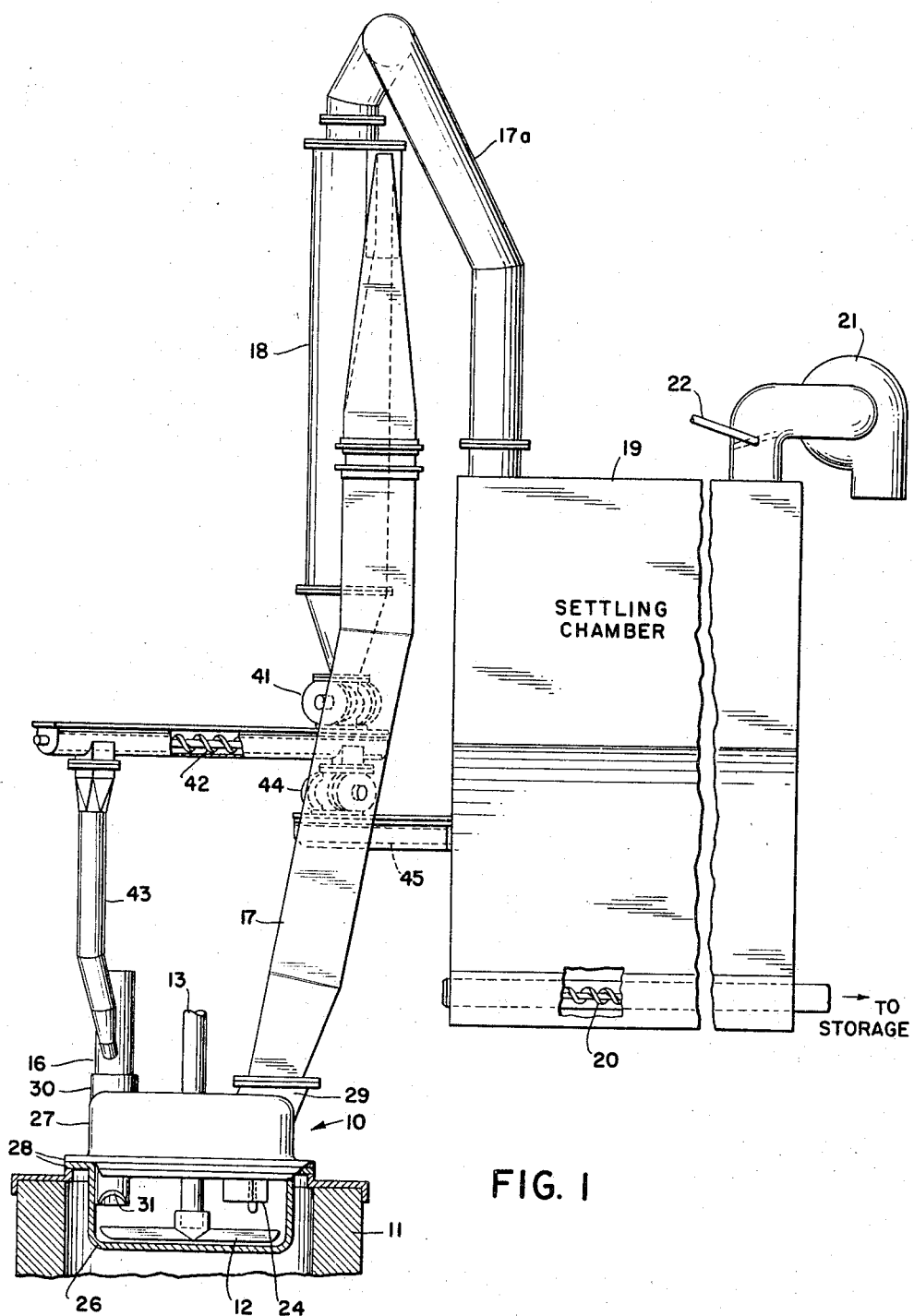
Figure 2:
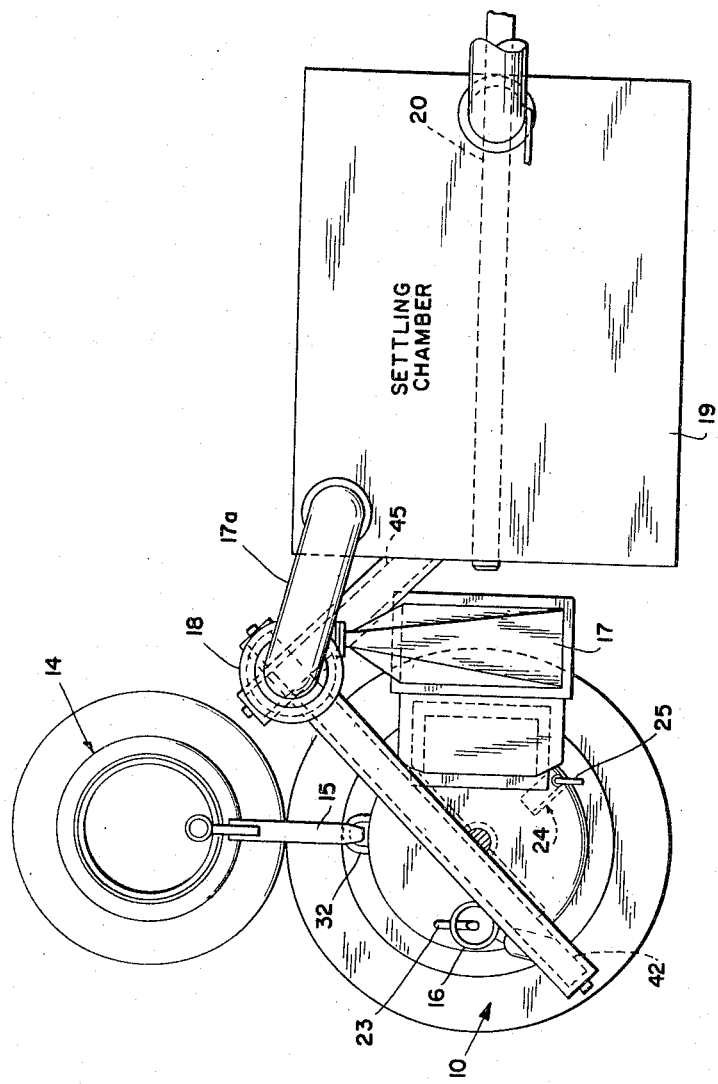
FIG. 2 is a plan view of the modified Barton pot, an associated melting pot, the uptake, cyclone collector, return feeders and part of the settling chamber as shown in FIG. 1.

Referring to the drawings, and particularly FIGS. 1 and 2, the apparatus of this invention is similar to that shown in Mayer Patent 2,235,487 but has been modified in various respects which we have found desirable for conducting the process of the invention. For example, the apparatus includes basically a Barton pot 10 mounted in suitable foundations 11 and provided with a rotary stirrer or agitator 12 carried on a vertical shaft 13. Lead is melted in a suitable melting pot 14 and a continuous stream of the molten lead is fed through a suitable feeding device 15 from the melting pot 14 into the Barton pot 10. The rate of flow of the molten lead may be controlled by the type of apparatus shown in said Mayer patent or by any other suitable metering arrangement capable of providing a continuous flow of molten lead at a controlled variable rate. Air flows into the Barton pot through an intake 16 and the product, consisting of a finely-divided mixture of lead oxides and metallic lead, is carried off through an uptake 17 to a cyclone collector 18, thence through a duct 17a to a settling chamber 19, where it falls to the bottom of the chamber and is removed to storage or further treatment by a screw conveyor 20 or other suitable means. A stream of air through the Barton pot 10, uptake 17 and settling chamber 19 is created by a suction fan 21 and the rate of flow of air is controlled by a suitable damper or valve 22. The rate of air flow can be measured at the intake 16 by means of the usual Pitot tube 23 and either recorded or used to vary the position of the damper 22 to maintain a constant draft by suitable mechanism (not shown).

Figure 3:
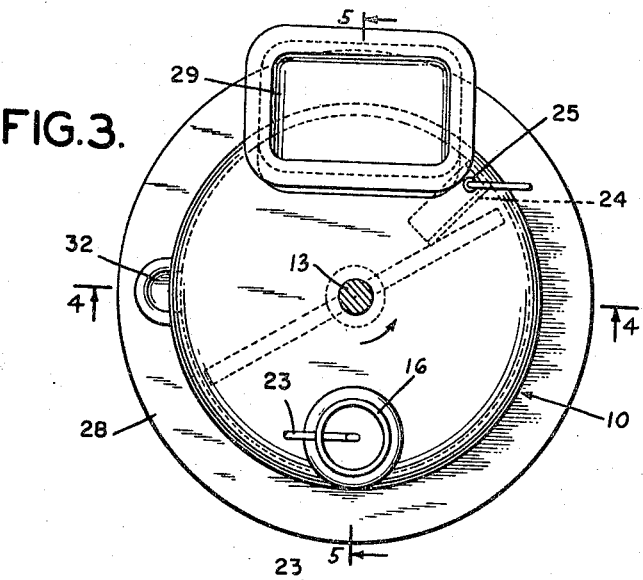
FIG. 3 is a plan view of a modified Barton pot shown on a larger scale than in FIG. 1.

A fixed radial baffle 24 is preferably positioned within the pot 10 so as to be on the side of the uptake 17 farthest from the molten lead inlet when the stirrer is rotated in the direction of the arrows indicated in FIGS. 2 and 3. A suitable pyrometer or other temperature measuring device 25 may be located adjacent the baffle 24 in a position to be protected by it, and may be connected to a suitable temperature indicating or recording device (not shown).

The lower end of the cyclone collector 18 is equipped with a rotary feeder 41 which communicates with a screw conveyor 42 which carries a portion of the collected product to a return tube 43 connected to the air intake 16 to thereby return a portion of the heavier material to the Barton pot 10. Communicating with the entry portion of the screw conveyor 42 is a second rotary feeder 44 which carries a portion of the collected material from the cyclone collector 18 through another screw conveyor 45 to the settling chamber 19.

Figure 4:
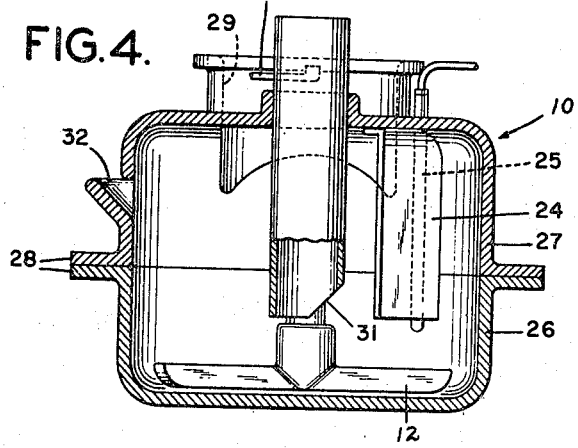
FIG. 4 is a vertical sectional view of this improved Barton pot taken generally on the line 4—4 of FIG. 3.
Figure 5:
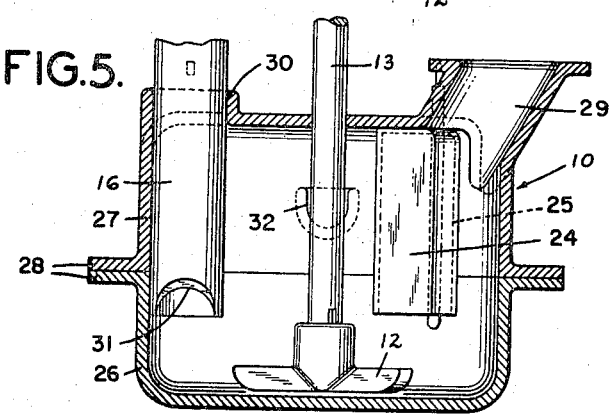
FIG. 5 is a vertical sectional view of the pot taken on the line 5—5 of FIG. 3.

Referring now more particularly to FIGS. 3, 4 and 5, the Barton pot proper can be made of the usual base section 26 and cover section 27 which are provided with suitable flanges 28, so that they can be bolted or otherwise attached together. The cover section 27 is provided on opposite sides with an outlet opening 29 to which the uptake 17 is attached and with an opening 30 through which the air inlet pipe 16 extends. The air inlet pipe differs from the usual Barton pot installation in that it extends down into the lower portion of the pot and introduces the air within a few inches above the top of the stirrer. This inlet pipe may be perforated or cut away at the bottom as at 31 on the side away from the motion of the stirrer. The cover section 27 of the pot is also provided with a spout or lip 32 through which the molten lead is introduced, this molten lead inlet being located about half way between the air inlet and the uptake. The radial baffle 24 is preferably positioned differently and made larger than usual so that it extends about half way into the center of the pot and also extends from the top down to a point approximately as far as the air inlet 16. The uptake 17 attached to the outlet opening 29 is preferably made much larger than usual in a cross section, and the uptake 17 is made much longer than is customary in Barton pot operations. We have found, for example, that a cross-sectional area of 800 square inches compared to the normal 400 square inches, combined with an uptake length of approximately 20 feet compared with the usual 6 to 8 feet, is preferable for operation in accordance with our invention. Such a construction, particularly when combined with the cyclone collector, provides better classification of particle sizes of the lead oxide product. The less desirable larger sized particles are more likely to be returned to the Barton pot where they undergo further oxidation and grinding off of the oxide coating by the dross in the bottom of the pot to reduce particle size to that desired and to reduce further the metallic lead content.

In the modified apparatus as has been actually used in practicing the invention when desiring higher metallic lead inclusions, the stirrer 12 is preferably maintained at only ¼ to ⅜ inch off the bottom of the pot. This is important to provide fine particle size division in the dross and in the final product. It also assists in quickly dispersing the molten lead throughout the dross and preventing any formation or accumulation of pools of molten lead within the pot. Generally speaking, when one desires to increase the metallic lead inclusion thereby forming a product more nearly approaching chemical grade litharge, it is possible to employ greater spacing between the stirrer and the bottom of the pot. For producing low metallic lead products, the spacing may exceed ½ inch.

Since the air inlet pipe extends down into the lower portion of the Barton pot it provides for greater cooling of the dross being agitated in the bottom of the pot and better utilization and circulation of air through the apparatus and better control of the temperature.

The larger size of the radial baffle 24 and its position before the uptake reduces the likelihood of large sized particles of material being swept up into the uptake. Therefore, only the smaller sized particles are likely to be removed from the Barton pot. This construction also helps to retain sufficient dross in the Barton pot to disperse the molten lead as it enters the pot into finely divided droplets so that at no time is there a molten pool or body of metallic lead in the pot. The finely-divided lead particles will oxidize to provide a more desirable small sized particle in the final product.

The cyclone collector 18 and the communicating rotary feeder 41 and screw conveyor 42 also assist in reducing the content of metallic lead to be withdrawn from the system. These parts also assist in maintaining the content of powdered dross in the Barton pot at the desired level. The maintenance of this level of powdered dross is important in dispersing the metallic lead in finely divided form free from any molten pool or body. Those portions of the oxide product collected in the cyclone which are not needed in the dross may be conveyed to the settling chamber 19, through the rotary feeder 44 and screw conveyor 45.

As utilized herein the term "dross" relates to the powdered lead oxide which is supplied to the Barton pot and into which the molten metallic lead is dispersed.

While the combination of enlarged uptake 17 and the cyclone collector 18 and their return system are excellent for returning a part of the lead oxide to the pot to provide dross, the dross may be maintained in the pot by any suitable manner. Thus the uptake 17 may be constructed long enough to return enough of the oxide to the pot or the dross may be supplied from some external source.

In the preferred operation of this equipment the pot is started by heating it and then a charge of powdered lead oxide dross is added. The suction fan 21 is turned on, the agitator or stirrer 12 is started rotating and feed of molten lead is started. Thereafter it is usually not necessary to supply any heat to the system except for that provided by the exothermic reaction and the molten lead and the heat under the pot may be turned off. Each time one arm of the stirrer 12 comes around, it throws the load of the pot violently against the baffle 24 which causes the material in the pot to be broken up into very fine particles. The flow of air from the inlet 16 through the pot and out the uptake 17 serves three different functions. It supplies the oxygen needed to oxidize metallic lead to lead oxide; it acts as a conveyor to carry the product out of the pot through the uptake 17 to the cyclone collector; and it exerts a substantial cooling effect on the pot and its contents. The flow of air is usually adjusted by trial and error to a desired setting, and thereafter it is varied only slightly during the course of operation.

We have found that by using a suitable baffle just ahead of the uptake, introducing the air into the lowest portion of the pot, and using a greatly enlarged and lengthened uptake equipped with a cyclone collector, the operation of the pot can be controlled so as to produce an oxide product of very fine particle size. This system is a substantial departure from previous Barton pot operations and permits one to continuously produce a lead oxide, including that low in metallic lead, having a small particle size so that no separate or subsequent reduction in particle size is required. Also the product produced is in a high state of purity, containing substantially no impurities, thereby making it particularly desirable in the chemical and ceramic industries where highly pure litharge is essential.

Until now it was customary to operate Barton pots with stirrer rotation speeds of about 150 r.p.m. Generally speaking, and again depending on the size of the particular unit higher stirrer rotation speeds are employed in the practice of this invention. The speeds may vary upwards of 150 r.p.m. to about 425 r.p.m., the lower speeds being employed when higher metallic lead inclusions are desired and the higher speeds being used when low metallic oxide products are desired. More specifically a rotation speed of upwards from 150 to about 225 r.p.m. is desirable for producing products having 18–24% metallic lead and for low metallic lead products speeds of about 300 r.p.m. are desirable.

An important feature of the process of the present invention is to maintain a leady oxide dross in the Barton pot during the process. It is possible to maintain the dross in the Barton pot by means of the particle size classification system provided by the operation of the uptake 17 and the cyclone collector 18 and its return conveyor system, whereby larger, over-size particles are returned to the Barton pot for further oxidation, if necessary and size reduction, and the desirable size particles are recovered in the settling chamber 19. Also, as explained hereinabove, any suitable means may be employed to maintain a supply of dross in the pot. When the molten lead feed is directed into the pot it is immediately finely dispersed in the leady oxide dross. This assists in markedly reducing the particle sizes of the litharge and metallic lead particles and it also prevents the formation of a molten pool or body of metallic lead in the pot. By continuing a desired rate of feeding the molten lead, regulating the rate of air flow and regulating the return flow of litharge to the pot, the Barton pot is operated at average temperatures for the contents of the pot in excess of the melting point of lead (621° F.) and desirably between about 700° and 900° F. Preferred average temperatures are between about 700° and 850° F. and more preferred average temperatures are between about 750° and 850° F., although in the case of products to contain 18 to 24% metallic lead, a temperature of 675–725° F. is highly satisfactory. The operations of the prior art at temperatures in excess of 900° F. undoubtedly played an important role in the failures of the prior art. When operating between the prescribed temperatures, the final lead oxide particles are of very fine particle size accompanied by a relatively high acid absorption value, low apparent density, and other properties which make the litharge greatly superior to the litharge obtained from the traditional mechanical furnaces used to produce a litharge of low metallic lead content.

The process of the present invention permits economical production of lead oxide either low in metallic lead or containing amounts up to 18 to 24% of metallic lead for use in lead storage battery plates. In accordance with the invention at high rates of production it is possible to feed the molten lead into the apparatus at rates of 1000 to 2200 pounds per hour in the improved apparatus of the size described hereinabove. This high rate still permits the retention of dross in the Barton pot. It is typical in the present process to retain a dross of about 250 pounds in the Barton pot. In the case of low metallic lead products it is desirable to observe a lower feed rate of molten lead, such as 1000 to 1500 pounds per hour. For products to contain higher metallic lead contents, such as 18 to 24% metallic lead, higher feed rates may be observed, such as 1800 to 2200 pounds per hour.

Generally speaking, in order to make a product of increasing metallic lead content, one selects higher feed rates of molten lead, lower operating temperatures, and lower stirrer speeds than are employed when producing the low metal products. Selection of the optimum conditions for any desired products will of course depend upon the size of the apparatus employed, the rate of production and the like.

One of the important advantages of the process of the invention is that it is possible to provide a uniform product of controlled lead content by observing the conditions prescribed for the process.

In order more clearly to disclose the nature of the present invention, the following specific illustrative examples will be set forth. It should be understood, however, that this is done solely by way of example and is intended neither to delineate the scope of the invention nor limit the ambit of the appended claims. Parts are expressed in terms of parts by weight.

*Example I*

Employing the apparatus and continuous process described hereinabove in conjunction with the drawings, and operating the stirrer at an average rate of about 300 r.p.m., maintaining the contents of the Barton pot at a temperature of 750°–850° F., introducing the molten lead into the pot at a rate of 1100–1150 pounds per hour, introducing air into the inlet tube at a pressure of 0.25 inch of water as measured by a Pitot tube with the air inlet having a diameter of 10 inches, and recycling a portion of the lead oxide at a sufficient rate to maintain a dross of about 250 to 300 lbs. in the pot at all times, a litharge product obtained was sampled from time to time during the process and the metallic lead content, apparent density and acid absorption determined. The results are listed in Table I, below:

TABLE I

| Drum | Metallic lead, percent by weight | Apparent Density (grams per cu. in.) | Acid Absorption No. |
|---|---|---|---|
| 1 | 1.2 | 23.5 | 175 |
| 2 | 1.1 | | |
| 5 | 1.06 | 23.9 | |
| 10 | 1.0 | 23.5 | |
| 15 | .98 | 23.9 | |
| 20 | 1.02 | 23.9 | 170 |
| 25 | .96 | 24.0 | |
| 30 | 1.07 | 24.1 | |
| 35 | 1.12 | 22.3 | |
| 40 | 1.08 | 22.5 | 178 |
| 45 | 1.12 | 20.6 | |
| 50 | 1.2 | 21.7 | |
| 55 | 1.16 | 22.5 | |
| 60 | 1.07 | 23.3 | 170 |
| 65 | 1.02 | 23.8 | |
| 70 | 1.1 | 24.2 | |

Microscopic study of the product obtained in the example showed the following results:

Oxide particles: Microns
    Principal range _____ 1–40
    Major portion _____ 2–12
    Average diameter by surface mean _____ 5
Metallic particles:
    Average diameter by surface mean _____ 12
Sample as a whole:
    Average diameter by surface mean _____ 5

*Microscopic count (detailed measurement)*

Average diameter by surface mean for the sample
  as a whole, microns _____ 4.6
Number of particles per cc. _____ $0.11 \times 10^{12}$ It would not have been possible to produce compositions having the extremely low percentage of metallic lead and small particle size of the particles obtained in the foregoing example by employing the prior art Barton oxide process.

The low lead content litharge products produced by the process of the invention are characterized by containing less than about 4% by weight and preferably less than about 2% by weight of metallic lead. They have an acid absorption value of between about 160 and 180, apparent densities of about 20–25, and an average particle size of about 5 microns.

*Example II*

Employing the apparatus and continuous process described hereinabove in conjunction wih the drawings, and operating the stirrer at an average rate of about 225 r.p.m., maintaining the contents of the Barton pot at a temperature of 680–690° F., introducing the molten lead in to the pot at a rate of about 2100 pounds per hour (faster than for low metallic lead products), introducing air into the inlet tube at a pressure of 0.5 inch of water as measured by a Pitot tube with the air inlet having a diameter of 10 inches, and recycling a portion of the lead oxide at a sufficient rate to maintain a dross of about 250 to 300 lbs. in the pot at all times, a litharge product obtained was sampled from time to time during the process and the metallic lead content, apparent density and acid absorption determined. The results are listed in Table II, below.

TABLE II

| Drum | Metallic lead, percent by weight | Apparent Density (grams per cu. in.) | Acid Absorption No. |
| --- | --- | --- | --- |
| 1 | 23.9 | | |
| 10 | 23.9 | 24 | 182 |
| 20 | 23.8 | 24.1 | 184 |
| 30 | 23.8 | 24.8 | 180 |
| 40 | 23.5 | 24.2 | 183 |
| 50 | 24.3 | 24.1 | 183 |
| 60 | 24.1 | 24.1 | 185 |
| 70 | 23.7 | 23.9 | 181 |
| 80 | 23.7 | 24.8 | 181 |

The product of the foregoing example was quite satisfactory for producing lead storage battery plates by the hydrosetting process. It would not have been possible to produce compositions having these properties and small particle size of the particles by employing the prior art Barton oxide processes. It is believed that the hydrosetting properties of the product of this example as well as those battery oxides generally produced by the instant invention are due in large measure to the fact that the metallic lead particles are of very thin section being flat or platelet-like in shape, which phenomenon provides for a maximum of surface area. Since hydrosetting of the battery plates involves evolution of heat by oxidation of the metallic lead, the instant products lend themselves to maximum degree of oxidation in shorter time than was possible with prior art materials.

*Example III*

Example II was repeated but the rate of air feed was reduced slightly and the rate of return from the classifier increased somewhat with the following results:

TABLE III

| Drum | Metallic lead, percent by weight | Apparent Density (grams per cu. in.) | Acid Absorption No. |
| --- | --- | --- | --- |
| 20 | 22.2 | 23.6 | 185 |
| 30 | 22.3 | 23.4 | 184 |
| 40 | 22.3 | 23.4 | 185 |
| 50 | 22.2 | 23.9 | 187 |
| 60 | 21.5 | 23.8 | 185 |

*Example IV*

Example II was repeated but the feed rate was reduced to 1950 pounds per hour of lead and the temperature to 660°–690° F. and the product had the following properties:

TABLE IV

| Drum | Metallic lead, percent by weight | Apparent Density (grams per cu. in.) | Acid Absorption No. |
| --- | --- | --- | --- |
| 1 | 22.1 | 21.1 | |
| 3 | 21.7 | 20.4 | 202 |
| 10 | 21.5 | 20.7 | 202 |
| 18 | 21.5 | 21.1 | 196 |

By increasing the feed rates of the lead to 2000 pounds per hour and temperature to 700–720° F., the product had the following properties:

TABLE V

| Drum | Metallic lead, percent by weight | Apparent Density (grams per cu. in.) | Acid Absorption No. |
| --- | --- | --- | --- |
| 1 | 20.2 | 19.7 | 191 |
| 50 | 20.0 | 20.4 | 192 |
| 100 | 20.0 | 21.6 | 190 |
| 165 | 20.7 | 21.4 | 191 |

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What is claimed is:
1. In a process of producing litharge, employing a Barton type of oxide pot, the steps which include introducing a stream of air into the lower portion of the pot, concurrently feeding molten lead into the pot in a continuous stream at a rate which maintains the contents of the pot at an average temperature of at least about 621° F. up to about 900° F. as a result of the exothermic reaction of the lead and air, vigorously agitating the pot contents by periodically dashing them against a large fixed baffle, continuously maintaining a dross of a powdered litharge in said pot, said dross being present at all times in a substantial amount and said amount of dross being sufficient to maintain the pot free from any pool of metallic lead, the said molten lead directed into the pot being dispersed into the dross, and conveying the litharge product from the pot by the aforesaid stream of air.

2. In a process of producing litharge having a metallic lead content of below about 4% by weight, employing a Barton type of oxide pot, carrying out concurrently the steps of introducing a stream of air into the lower portion of the pot, feeding molten lead into the pot in a continuous stream at a rate which maintains the contents of the pot at an average temperature between about 750° F. and 850° F. as a result of the exothermic reaction of the lead and air, vigorously agitating the pot contents by periodically dashing them against a large fixed baffle, conveying the litharge product from the pot by aforesaid stream of air, classifying the litharge product conveyed from the pot and recycling the larger heavier particles of litharge to the pot to continuously maintain a dross of powdered litharge in said pot at all times, said dross being present at all times in a substantial amount and said amount of dross being sufficient to maintain the pot free from any pool of metallic lead, and the said molten lead directed into the pot being dispersed into said dross.

3. In a process of producing lead oxide products having a metallic lead content of up to about 24% by weight, employing a Barton type of oxide pot, the steps which include introducing a stream of air into the lower portion of the pot, concurrently feeding molten lead into the pot in a continuous stream at a rate which maintains the contents of the pot at an average temperature between about 675° F. and 725° F. as a result of the exothermic reaction of the lead and air, vigorously agitating the pot contents by periodically dashing them against a large fixed baffle, conveying the oxidation product from the pot by the aforesaid stream of air, classifying the oxidation product conveyed from the pot and recycling the larger heavier particles of litharge to the pot to continuously maintain a dross of powdered litharge in said pot at all times, said dross being present at all times in a substantial amount and said amount of dross being sufficient to maintain the pot free from any pool of metallic lead, and the said molten lead directed into the pot being dispersed into said dross.

4. In a process employing a Barton type of oxide pot for producing lead oxide having inclusions of varying amounts of metallic lead the steps comprising introducing a stream of air into the lower portion of the pot, concurrently feeding molten lead into the pot in a continuous stream which maintains the contents of the pot at an average temperature of upwards from 621° F. to about 900° F. as a result of the exothermic reaction of the lead and air, vigorously agitating the pot contents by periodically dashing them against a large fixed baffle, conveying the lead oxide containing product from the pot by the aforesaid stream of air, classifying the lead oxide containing product conveyed from the pot and recycling the larger heavier particles of lead oxide to the pot to continuously maintain a dross of powdered lead oxide in said pot at all times, said dross being present at all times in a substantial amount and said amount of dross being sufficient to maintain the pot free from any pool of metallic lead, and the said molten lead directed into the pot being dispersed into said dross.

5. Process according to claim 4 wherein higher amounts of metallic lead are contained in the product by increasing the feed rate of the molten lead while employing temperatures upwards from 675° F. to about 750° F. and performing the agitation by revolving a stirrer at speeds upward from 150 r.p.m. to about 225 r.p.m.

References Cited

UNITED STATES PATENTS

| | | | |
|---|---|---|---|
| 988,963 | 4/1911 | Barton | 23—146 |
| 1,617,887 | 2/1927 | Wilhelm | 23—146 |
| 2,065,218 | 12/1936 | Garesche | 23—146 |
| 2,235,487 | 3/1941 | Mayer | 23—146 |
| 2,237,043 | 4/1941 | Wilson | 23—146 |
| 2,875,027 | 2/1959 | Dye | 23—285 |
| 2,984,544 | 5/1961 | Joly | 23—146 |
| 3,039,859 | 6/1962 | Kurz | 23—285 |

FOREIGN PATENTS

| | | |
|---|---|---|
| 220,823 | 8/1925 | Great Britain. |

OTHER REFERENCES

Hoffman—"Metallurgy of Lead"—1st Edition, 1918—pp. 597–599—published by McGraw-Hill Book Company, Inc.

OSCAR R. VERTIZ, *Primary Examiner.*

MAURICE A. BRINDISI, BENJAMIN HENKIN, MILTON WEISSMAN, *Examiners.*

H. T. CARTER, B. H. LEVENSON,
*Assistant Examiners.*